United States Patent
Lin et al.

(10) Patent No.: US 11,879,214 B2
(45) Date of Patent: Jan. 23, 2024

(54) ENVIRONMENTALLY-FRIENDLY HEAT SEALABLE AQUEOUS BARRIER COATING FOR CELLULOSIC SUBSTRATE AND METHODS OF MAKING AND USING THE SAME

(71) Applicant: Actega North America, Inc., Cinnaminson, NJ (US)

(72) Inventors: Anshyang Lin, Mt. Laurel, NJ (US); Stephen Martin, Monroe Township, NJ (US); Carmen Panto, Jr., Marlton, NJ (US); Grant Schutte, Pittsburgh, PA (US)

(73) Assignee: ACTEGA NORTH AMERICA, INC., Cinnaminson, NJ (US)

( * ) Notice: Subject to any disclaimer, the term of this patent is extended or adjusted under 35 U.S.C. 154(b) by 235 days.

(21) Appl. No.: 17/178,715

(22) Filed: Feb. 18, 2021

(65) Prior Publication Data
US 2021/0348338 A1    Nov. 11, 2021

Related U.S. Application Data

(60) Provisional application No. 63/020,103, filed on May 5, 2020.

(51) Int. Cl.
*D21H 21/16*     (2006.01)
*C09D 5/00*     (2006.01)
(Continued)

(52) U.S. Cl.
CPC .............. *D21H 21/16* (2013.01); *C09D 5/002* (2013.01); *C09D 7/65* (2018.01); *C09D 123/0869* (2013.01); *C09D 133/062* (2013.01); *D21H 19/12* (2013.01); *D21H 19/824* (2013.01)

(58) Field of Classification Search
CPC .......... C09D 5/02; C09D 5/002; C09D 5/024; C09D 7/65; C09D 123/0869;
(Continued)

(56) References Cited

U.S. PATENT DOCUMENTS

| 4,599,392 A | 7/1986 | McKinney et al. |
| 4,988,781 A | 1/1991 | McKinney et al. |

(Continued)

FOREIGN PATENT DOCUMENTS

| CA | 2818315 A1 | 11/2013 |
| CN | 105102508 A | 11/2018 |

(Continued)

OTHER PUBLICATIONS

International Preliminary Report on Patentability on PCT/US2021/024023 dated Nov. 17, 2022.

*Primary Examiner* — Satya B Sastri
(74) *Attorney, Agent, or Firm* — LADAS & PARRY LLP

(57) ABSTRACT

An aqueous barrier coat for formable cellulosic substrates comprises a blend of A) at least one aqueous polymer binder dispersion at 40 wt % to 95 wt %, B) at least one active filler at 3 wt % to 30 wt % and, C) one or more optional additives, such as wetting additives, dispersants, thickeners, defoamers, and crosslinkers. Crystallinity is present in at least one of the polymer binder dispersion and active filler particle. The resulting dried film has a shear storage modulus between 50° C. and 60° C. in the range of $1.5 \times 10^6$ to $1 \times 10^9$ Pascals, a shear storage modulus between 80° C. and 90° C. in the range of $2 \times 10^5$ to $5 \times 10^7$ Pascals, and a shear storage modulus between 100° C. and 110° C. is in the range of $5 \times 10^3$ to $1 \times 10^6$ Pascals. The total weight % of crystalline polymer binder and the crystalline active filler combined is greater than 50%.

20 Claims, 3 Drawing Sheets

(51) Int. Cl.
- *C09D 123/08* (2006.01)
- *D21H 19/82* (2006.01)
- *C09D 7/65* (2018.01)
- *D21H 19/12* (2006.01)
- *C09D 133/06* (2006.01)

(58) Field of Classification Search
CPC ...... C09D 191/06; D21H 21/16; D21H 19/00; D21H 19/10; D21H 19/12; D21H 19/18; D21H 19/84; D21H 19/824; D21H 27/10
See application file for complete search history.

(56) References Cited

U.S. PATENT DOCUMENTS

| | | |
|---|---|---|
| 5,938,437 A | 8/1999 | DeVincenzo |
| 9,803,088 B2 | 10/2017 | Iyer et al. |
| 2007/0292705 A1* | 12/2007 | Moncla .................... C08J 7/048 |
| | | 524/522 |
| 2011/0046284 A1 | 2/2011 | Berube et al. |
| 2013/0225744 A1 | 8/2013 | Iyer et al. |
| 2015/0353755 A1* | 12/2015 | Czudaj ................... D21H 17/37 |
| | | 524/523 |
| 2019/0010362 A1* | 1/2019 | Lin ............................ C09J 5/06 |

FOREIGN PATENT DOCUMENTS

| | | | |
|---|---|---|---|
| EP | 0991815 B1 | 8/2002 | |
| EP | 1963573 B1 | 6/2007 | |
| EP | 2470718 A2 | 7/2012 | |
| EP | 2470718 B1 | 7/2015 | |
| EP | 1963573 B1 * | 2/2016 | .......... D06M 15/227 |
| WO | WO-2016077907 A1 * | 5/2016 | ........... C09D 133/08 |
| WO | WO-2017210606 A1 * | 12/2017 | ............ C08F 212/12 |

\* cited by examiner

ENVIRONMENTALLY-FRIENDLY HEAT SEALABLE AQUEOUS BARRIER COATING FOR CELLULOSIC SUBSTRATE AND METHODS OF MAKING AND USING THE SAME

FIELD OF THE INVENTION

The present invention relates to an environmental friendly, recyclable, repulpable, heat sealable, and overprintable aqueous barrier coating having a barrier to water, oil, grease and/or moisture that can be used on a cellulosic substrate to form shaped products, such as paper cups and food service trays.

BACKGROUND OF THE INVENTION

Cellulose-based packaging materials for containers and product packages, such as packaging paper or board, are usually provided with a polymeric coating that makes the materials liquid-tight and allows forming the container or package by heat sealing. Food and food service packages using paper or paperboard often require enhanced barrier properties, including barriers against oil, grease, water, and/or moisture vapor. Additionally, many paper or paperboard packages stock, for example, paper or paperboard cup stock for food or drink services, also require the paper or paperboard be heat sealable, making it possible to form cups on a cup machine.

Low-density polyethylene (LDPE) is widely used for coating due to its good liquid barrier properties (i.e. resistance to water, tea, coffee, etc.) and good heat-sealability. Crystallinity in LDPE film helps the polymer to melt readily when the melting point is reached to provide the seal and its fast recrystallization during the cooling step allows fast securance of the seal when the pressure is removed. Polyethylene (PE) extrusion coated paperboard currently still dominate in such applications by providing both required barrier and heat seal properties. However, packages including paper cups and trays using a PE extrusion coating have difficulties in repulping and are not as easily recyclable as conventional paper or paperboard, creating problems in recovering the useful fibers from the packages and causing environmental concerns if these packages go to landfill. There are increasing demands for alternative solutions including coating technologies to replace paperboard packages that contain a PE coating or film layer.

Repulpable and recyclable aqueous coatings are one of the promising solutions to address this need. However, most aqueous coatings still cannot meet the requirements compared to LDPE extrusion coated paper/paper board for various reasons, including good seal strength, fast sealing speed, good roll block resistance, providing an adequate barrier to water, oil, grease, and/or moisture, as well as offering over-printability with decorative inks. Balancing all these required properties is difficult, as they can be contradictory to one another. For example, most polymers or binders in aqueous coatings are amorphous and become soft and sticky at elevated temperature (even at 50-55° C.) and/or pressure in production, converting, shipping, and storage of the coated board causing blocking, while it has to maintain the same heal seal converting speed as the LDPE coated boards especially in a cup making process. Another example is to achieve acceptable barrier properties at much low dried coat weight, 5 to 15 grams per square meter (gsm), compared to extruded LDPE at 25 to 50 gsm coating weight. Another balance act is between good barrier properties (normally achieved by lower surface tension) and ink over-printability, especially with aqueous inks.

Much prior art exist with respect to treating cellulosic with coatings, including, for example, Moncla et. al., EP 1963573B1 and Aho et al, EP 0991815B1. Moncla discloses a cellulose article incorporating cellulose fibers with an aqueous dispersion. Aho discloses a coating having at least one polymer dispersion, a talc containing polymer dispersion applied on the inside surface of the container, only applied during the manufacturing process in a board machine.

BRIEF SUMMARY OF THE INVENTION

The present invention provides an aqueous barrier coat that is an environmentally friendly, recyclable, heat sealable, and overprintable, having resistance to the permeation of water, oil, grease, and other cold and hot liquids and that can be used on cellulosic substrate to formed constructions including paper cups and food service trays. The aqueous barrier coating comprises a blend of A) at least one aqueous polymer binder dispersion, at 40 wt % to 95 wt %, B) at least one active filler at 3 wt % to 30 wt %, C) one or more optional additives (including but not limited to wetting additives, dispersants, thickeners, defoamers, and cross-linkers); wherein crystallinity is present in at least in one of the at least one polymer binder dispersion (composition A) or the least one active filler (composition B); and that the resulting dried film has a shear storage modulus between 50° C. and 60° C. in the range of $1.5 \times 10^6$ to $1 \times 10^9$ Pascals, a shear storage modulus between 80° C. and 90° C. in the range of $2 \times 10^5$ to $5 \times 10^7$ Pascals, and a shear storage modulus between 100° C. and 110° C. in the range of $5 \times 10^3$ to $1 \times 10^6$ Pascals. The total weight % of crystalline polymer binder and the crystalline active filler combined is greater than 50%, preferably greater than 60% and most preferably greater than 65%. The aqueous barrier coating can be applied on one or both of the major sides of the cellulosic substrate. Optionally, an aqueous sealing primer can be applied and dried onto one or both of the major sides of the cellulosic substrate prior to application of the barrier coat, wherein the aqueous sealing primer comprises of A) at least one aqueous polymer binder dispersion at 30-90%, B) at least one regular filler chosen from coating grade clays, calcium carbonate, talc, barium sulfate, zinc sulfate, aluminum sulfate, calcium oxide reaction products, titanium dioxide, lithopone, zinc sulfide, alumina, silica, sodium hexametaphosphate, and mineral particles pretreated with polymer binder at 5-60 wt %, and C) one or more optional additives, such as wetting additives, dispersants, thickeners, waxes defoamers, and crosslinkers).

A coated cellulosic substrate with above mentioned inventive aqueous barrier coating with or without the optional sealing primer provides easy repulpability and recyclability, good heat sealability, resistance to roll blocking, container forming feature, good barrier to water (including hot water and hot coffee), oil and grease liquids as well as exhibiting good over-printability.

DETAILED DESCRIPTION OF THE INVENTION

Figure 1:
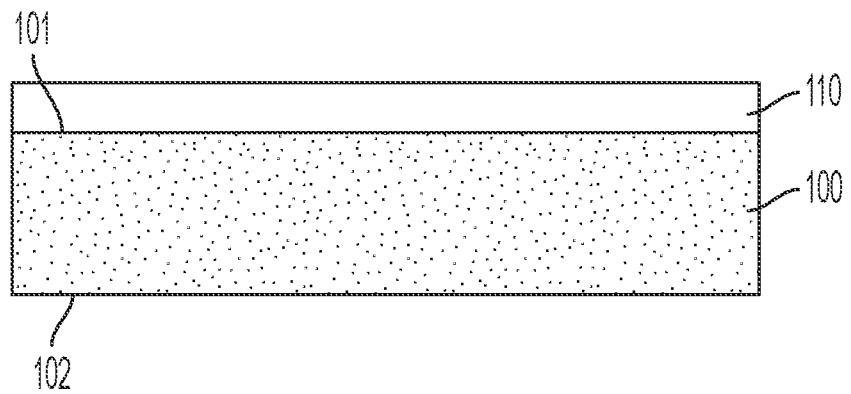
FIG. 1 illustrates a cellulosic substrate coated on its first major side with the inventive aqueous barrier coating.
Figure 2:
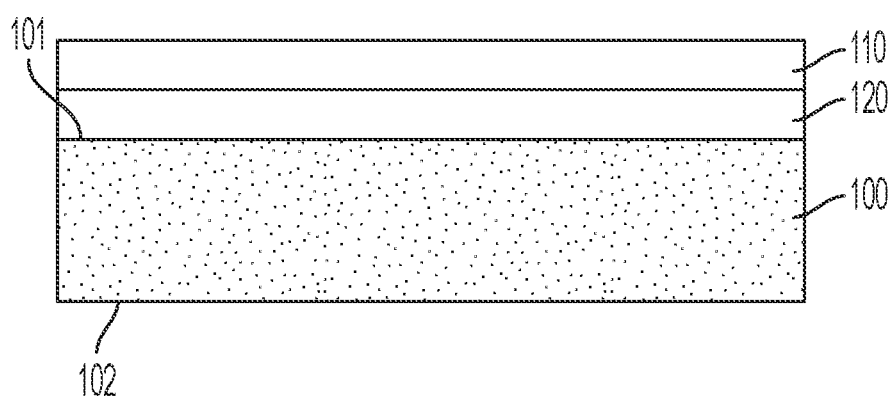
FIG. 2 illustrates a cellulosic substrate coated on its first major side with an aqueous sealing primer and the aqueous barrier coating.

The present invention provides an aqueous barrier coating that is an environmentally friendly, recyclable, heat sealable, roll block resistant, and overprintable. The aqueous coating is resistant to the permeation of water, oil, grease, and other cold and hot liquid and that can be used on cellulosic substrates to form shapes including paper cups and food service trays. The aqueous barrier coating of the present invention comprises a blend of A) at least one aqueous polymer binder dispersion at 40 wt % to 95 wt %, B) at least one active filler at 3 wt % to 30 wt %, and C) one or more optional additives, including but not limited to wetting additives, dispersants, thickeners, and defoamers Crystallinity is present in at least in one of the at least one polymer binder dispersion (composition A) or the at least one active filler (composition B). The resulting dried film has a shear storage modulus between 50° C. and 60° ° C. in the range of $1.5 \times 10^6$ to $1 \times 10^9$ Pascals, shear storage modulus between 80° C. and 90° C. in the range of $2 \times 10^5$ to $5 \times 10^7$ Pascals, and a shear storage modulus between 100° C. and 110° C. in the range of $5 \times 10^3$ to $1 \times 10^6$ Pascals. The total weight % of the crystalline polymer binder and the crystalline active filler combined is greater than 50%, preferably greater than 60% and most preferably greater than 65%.

The aqueous barrier coating can be applied to either one or both major sides of the cellulosic substrate. Optionally, an aqueous sealing primer can be applied and dried onto either or both of the major sides of the cellulosic substrate prior to application of the barrier coat. The aqueous sealing primer comprises A) at least one aqueous polymer binder dispersion at 30-90 wt %, B) at least one regular filler chosen from coating grade clays, calcium carbonate, talc, barium sulfate, zinc sulfate, aluminum sulfate, calcium oxide reaction products, titanium dioxide, lithopone, zinc sulfide, alumina, silica, sodium hexametaphosphate, and mineral particles pretreated with polymer binder at 5-60 wt %, and C) one or more optional additives, such as wetting additives, dispersants, thickeners, waxes defoamers, and crosslinkers.

The cellulosic substrate herein may comprise cellulosic materials. Such cellulosic based substrates may include paper. The term "paper" as used herein should be understood to mean all forms of paper, including board, such as paperboard products, white-lined board, linerboard, and cardboard. Paper may also include newsprint, uncoated groundwood, coated groundwood, coated free sheet, uncoated free sheet, packaging papers, industrial papers, corrugating medium, writing paper, typing paper, photo quality paper, or wallpaper. The cellulosic-based substrates may be formed from one or more webs, e.g., a single-layered or multi-layered paper web formed from a blend of fibers. As seen in the Figures, the cellulosic substrate 100 may be (or may include) any cellulosic material that is capable of being coated with the optional aqueous sealing primer 120 and the aqueous barrier coating layer 110 on one side 101 or both sides (101 and 102) of this cellulosic substrate. Those skilled in the art will appreciate that the cellulosic substrate 100 may be bleached or unbleached. Examples of appropriate cellulosic paperboard substrates include corrugating medium, linerboard, solid bleached sulfate (SBS), uncoated unbleached kraft (UUK), and folding box board (FBB). FIG. 5 illustrates the major thickness difference between an LDPE extruded coating on a pair of cellulosic substrates sealed together and the inventive aqueous barrier coating, alone or with an aqueous sealing primer on a similar pair of cellulosic substrates. The thickness difference demonstrates the potential thermal conductivity difference of the sealed containers (such as cups) made from two process as these polymers themselves are poor conductor and thinner coating weight would be affected more by the temperature of the liquids it contains.

The paperboard substrate 100 may have an uncoated basis weight of at least about 40 pounds per 3000 ft$^2$. In one embodiment, the paperboard substrate 100 may have an uncoated basis weight ranging from about 40 pounds per 3000 ft$^2$ to about 300 pounds per 3000 ft$^2$. In another embodiment, the paperboard substrate 100 may have an uncoated basis weight ranging from about 85 pounds per 3000 ft$^2$ to about 250 pounds per 3000 ft$^2$. In yet another embodiment the paperboard substrate 100 may have an uncoated basis weight ranging from about 100 pounds per 3000 ft$^2$ to about 220 pounds per 3000 ft$^2$. Furthermore, the paperboard substrate 100 may have a caliper (thickness) ranging from about 4 points to about 30 points (0.008 inch to 0.030 inch). In one embodiment, the caliper range is from about 8 points to about 24 points. In another embodiment, the caliper range is from about 14 points to about 18 points.

Figures 5A, 5B:
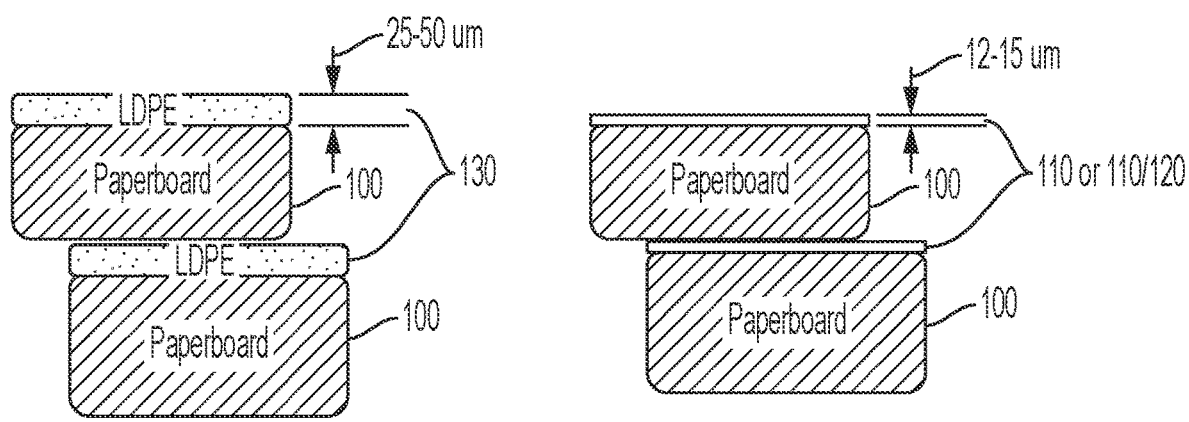
FIGS. 5A and 5B illustrates the major thickness difference between an LDPE extruded coating on a pair of cellulosic substrates sealed together (FIG. 5A) and the inventive aqueous barrier coating (FIG. 5B), alone or with an aqueous sealing primer on a similar pair of cellulosic substrates.

Despite numerous attempts as outlined above in the prior art to develop an aqueous barrier coating for cellulosic substrates in an effort to replace the LDPE extruded paperboard that currently dominates the marketplace, none have successfully demonstrated to offer the balanced properties of LDPE extruded boards, including barrier resistance to water (cold and hot) and oil and grease, good heat sealability and resistance to roll blocking, as well as demonstrating acceptable container forming, process behaviors and over-printability, combined with easy repulpability and recyclability. There are three key important aspects that are overlooked by many but are critical to the successful replacement of LDPE extruded boards. The first aspect is the coating thickness difference between the LDPE extrusion option as shown in FIG. 5A and an aqueous barrier coating alternative, as shown in FIG. 5B. A lower dried coating thickness for the aqueous coating alternative (12-15 microns vs. 25 to 50 microns) means that the aqueous barrier coating will have a higher demand as a barrier to water, oil, and grease that must be accommodated for. For hot liquid applications, such as for hot water and hot coffee cups, the heat from the hot liquid will be easier to conduct through the seal lines and can soften the thinner dried aqueous barrier coatings that bonds two layers together; and that in the heat seal process, the thinner dried aqueous layer will be heated much faster and change the processing variables.

The second aspect is the crystallinity in LDPE extrusion polymers. The crystallinity allows the LDPE polymer to melt and flow faster above its melting point while assisting in the fast heat seal bond development when it is cooled down to temperature slightly lower than its melting point due to the phenomenon known as heating-cooling hysteresis. LDPE's melting point in the range from 95° C. to 110° C. makes it block free during processing, storage, and shipping without the addition of any other anti-blocking additive.

Figure 6:
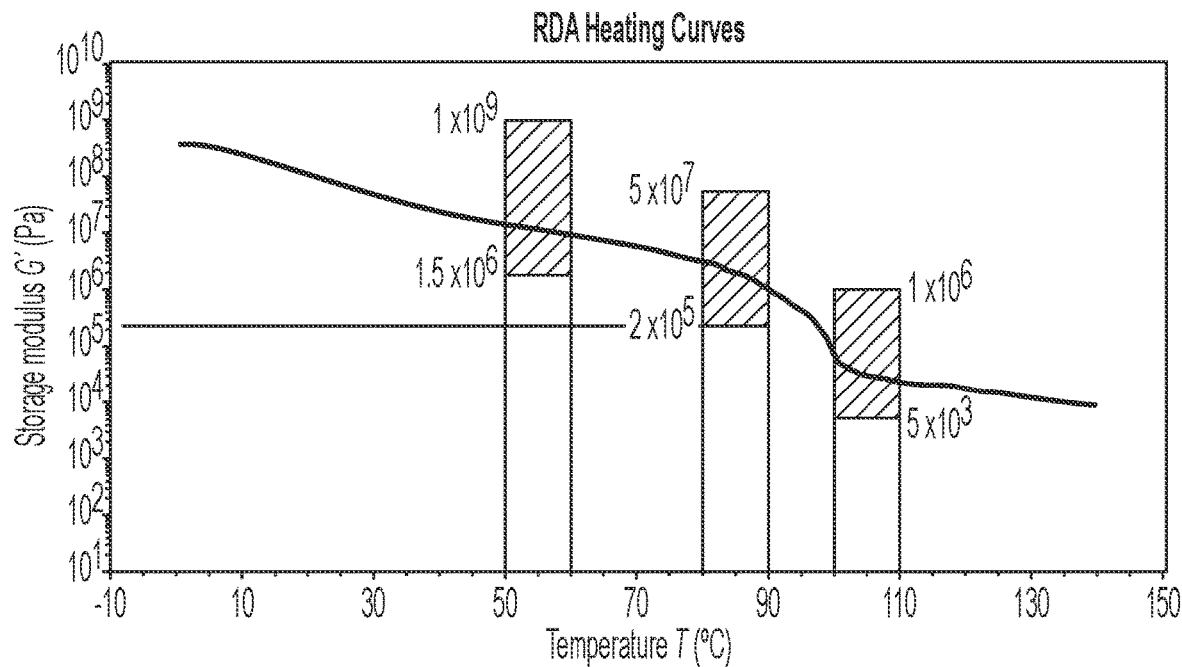
FIG. 6 illustrate the shear elastic modulus of a typical LDPE as applied to LDPE extruded cellulosic substrates over a heating range with specified ranges of shear elastic modulus of an aqueous barrier coating dried film at various temperature ranges.

The third aspect is the elastic modulus profile of LDPE in the use/service temperature range from ambient temperature to the storage and shipping temperature range and further all the way up to the heat seal temperature range during the cup making process. While the melting point of the crystallinity of the individual component or the whole composition of aqueous barrier coatings, as well as the glass transition of the polymeric film can be measured or determined, the melting point, Tg, or its transition range cannot be used to determine whether the resulting film can be processed similar to LDPE, whether it is strong enough or whether it can yield a bond strength similar to those of the LDPE material. The elastic modulus can define strength of a polymer in its solid state, transition state, and molten state and be used to characterize and define the processivity of the dried film of aqueous barrier coatings as compared to those of the LDPE, and it appears that none of the prior art has recognized the ability to use elastic modulus as a measure of the effectiveness of an aqueous barrier coating as a substitute to LDPE. In particular, it has been determined that the shear elastic modulus profile from a rheometric dynamic analyzer (RDA) can be used to develop a polymeric film suitable for use through a temperature range, say from 0° C. to 130° C., without losing the integrity of the material during the measurement itself. The shear elastic modulus of LDPE used in making of the LDPE extruded paperboard is shown in FIG. 6. Without limited to any particular theory, we chose a shear elastic modulus in the temperature ranges of 50° C. to 60° C., 80° C. to 90° C., and 100° C. to 110° C. for the dried aqueous barrier coating to describe its blocking resistant zone, transition zone and molten zone, as well as the speed of flow. It is the crystallinity in one or more of the present invention's A and B components, as well as the shear elastic modulus in the three temperature zones, which allows the composition to be a viable alternative to LDPE. The resulting dried film of the aqueous barrier coating has a shear storage modulus between 50° C. and 60° C. in the range of $1.5 \times 10^6$ to $1 \times 10^9$ Pascals, a shear storage modulus between 80° C. and 90° C. in the range of $2 \times 10^5$ to $5 \times 10^7$ Pascals, and a shear storage modulus between 100° C. and 110° C. in the range of $5 \times 10^3$ to $1 \times 10^6$ Pascals.

In aqueous barrier coating of this invention, the crystallinity can come from at least one of the aqueous binder dispersions in composition A and/or from at least one of active fillers from composition B where the active filler is dry wax particle or pre-dispersed wax particle dispersion as supplied and has a defined melting point. Without being limited to any particular theory, the crystallinity in the aqueous polymer binder dispersion or in the melting wax helps determine the anti-block temperature, the tensile strength below and above the composition's melting point, and speed of the melt flow and well as the speed of the bond development during the heat seal cycles of the coated cellulosic substrate.

The melting point associated with the crystalline materials can be best characterized by and measured by differential scanning calorimetry (DSC) per ASTM D3418. The melting point of the crystalline phase of at least one of the aqueous polymer binder dispersion in composition A of the aqueous barrier coating is in the range of 50° C. to 140° C., preferably in the range of 60° C. to 130° C., and most preferably in the range of 65° C. to 120° C. The crystalline polymer in the aqueous binder dispersion are dispersions of an ethylene containing homopolymer, copolymers stabilized in water, and mixtures of thereof including those mentioned in US 2007/0292705 and EP 1963573B1; aqueous dispersion of ethylene-acrylic acid (EAA) and ethylene-methacrylic acid copolymers, such as those available under the trademarks PRIMACOR™ (trademark of SK Global Chemical), NUCREL™ (trademark of E. L DuPont de Nemours), and ESCOR™ (trademark of ExxonMobil) and described in U.S. Pat. Nos. 4,599,392, 4,988,781, and 5,938,437 as well as CN105102508A. Aqueous dispersion of polymers include ethylene ethyl acrylate (EEA) copolymer, ethylene methyl methacrylate (EMMA), and ethylene butyl acrylate (EBA); other aqueous dispersion of ethylene-carboxylic acid copolymer may also be used including ethylene/methacrylic acid copolymers, ethylene/itaconic acid copolymers, ethylene/methyl hydrogen maleate copolymers, ethylene/maleic acid copolymers, ethylene/acrylic acid/methyl methacrylate terpolymers, ethylene/acrylic acid/ethyl acrylate terpolymers, ethylene/methacrylic acid/ethyl acrylate terpolymers, ethylene/itaconic acid/methyl methacrylate terpolymers, ethylene/methyl hydrogen, maleate/ethyl acrylate terpolymers, ethylene/acrylic acid/vinyl acetate terpolymers, ethylene/methacrylic acid/vinyl acetate terpolymers, ethylene/acrylic acid/vinyl alcohol terpolymers, ethylene/propylene/acrylic acid terpolymers, ethylene/acrylamide/acrylic acid terpolymers, ethylene/styrene/acrylic acid terpolymers, ethylene/methacrylic acid/acrylonitrile terpolymers, ethylene/fumaric acid/vinyl methyl ether terpolymers, ethylene/vinyl chloride/acrylic acid terpolymers, ethylene/vinylidene chloride/acrylic acid terpolymers, polyethylene/acrylic acid graft copolymers, polyethylene/methacrylic acid graft copolymers, polymerized ethylene/propylene/acrylic acid graft terpolymers; fatty acid modified polyester terephthalate (PET), and tall oil modified soft polyester terephthalate (PET) as described in CA 2818315A1, Those having ordinary skill in the art will recognize that a number of other polymers may also be used.

Suitable non-crystalline aqueous polymer binder dispersions in composition A of the aqueous barrier coatings include, but are not limited to, acrylic base polymers or copolymers, vinyl acrylic acid copolymers, styrene acrylic copolymers, a styrene-butadiene copolymers, styrene-acrylate copolymers, a styrene-acrylonitrile copolymers, styrene-acrylonitrile-acrylate copolymers, polyurethanes, polyvinylalcohols, polyvinylacetates, dextrin, modified starches, asphalt emulsions, corn starch, nylon, polypropylene, polyhydroxyalkanoates, combinations thereof, and the like. Some suitable examples of commercial acrylic-based polymer dispersion products are, for food contact applications, include Joncryl® DFC 3030, available from BASF, NeoCryl A-2092, available from DSM, and Texicryl 13-525 available from Scott Bader. Texicryl 13-814 available from Scott Bader, Neocryl A-1095, available from DSM, and Induprint SE 245, available from Indulor can be used in non-food applications. Some suitable examples of commercially available styrene-butadiene copolymer dispersion products suitable for inclusion in the coating compositions described herein for food contact applications, include Genflo 3003, available from Omnova Solutions, Rovene 4019, available from Mallard Creek, and Savinex 98F10, available from Synthetic Latex Company. For non-food contact applications products include, for example, Rovene 4009, available from Mallard Creek, and ENCOR DL 313 4009, available from Arkema.

The "active" fillers of composition B of the aqueous barrier coating not only may lower the cost of the coating but more importantly provide a specific contribution to barrier properties, raise the shear elastic modules curve upwards, and provide block resistance. These active fillers include crystalline waxes and non-crystalline standard fillers that contribute to the barrier properties.

The crystalline waxes in the active filler of composition B of the aqueous barrier coating can be a dry wax particle or pre-dispersed wax particle dispersion having a melting point in the range of 70° C. to 145° C., preferably in the range of 80° C. to 130° C., and most preferably in the range of 95° C. to 125° C. Suitable melting waxes include, but are not limited to, paraffin waxes, acrylic-grafted paraffin waxes, crystalline waxes, polyethylene waxes (high density and low density), synthetic hydrocarbon waxes produced by Fisher-Tropsch process, polypropylene waxes, oxidized polyethylene waxes, polyethylene/amide waxes, polyethylene/carnauba waxes, polyethylene/polytetrafluorethylene waxes, carnauba waxes, Ethylene-Bis-Stearamide (EBS) waxes, ethylene bis oleamide waxes and combinations thereof, and the like.

Suitable non-crystalline active fillers in composition B of the aqueous barrier coating include, but are not limited to, coating grade clays, calcium carbonate, talc, barium sulfate, zinc sulfate, aluminum sulfate, calcium oxide reaction products, titanium dioxide, lithopone, zinc sulfide, alumina, silica, sodium hexametaphosphate, and mineral particles pretreated with polymer binder, such as identified in U.S. Pat. No. 9,803,088B2, US 2011/0046284A1, EP2470718A2, EP2470718B1, US2013/0225744A1, and mixtures thereof.

Optional additives may be used in the aqueous barrier coatings and in the optional sealing primer include defoamers, wetting agents, leveling agents, colloidal stabilizers, rheology modifiers, biocides, pesticides, surfactants, adhesion promoters, silicones, light stabilizers, de-gassing additives, ammonia, flow promoters, antioxidants, stabilizers, dispersants, plasticizers, rheological additives, crosslinker, and others as known in the art, as well as and combinations thereof. In addition, other additives can be added to the coatings of the present invention in order to enhance the usefulness of the coatings or the coatings produced by curing the coatings. For example, plasticizers, antimicrobials, coloring agents, optical brighteners, ultraviolet absorbers, antioxidant, and the like can be incorporated into the coatings of the present invention, if desired.

The aqueous polymer binder in composition A for use in the aqueous sealing primer includes, but not limited to acrylic base polymers or copolymers, vinyl acrylic acid copolymers, styrene acrylic copolymers, a styrene-butadiene copolymers, styrene-acrylate copolymers, styrene-acrylonitrile copolymers, styrene-acrylonitrile-acrylate copolymers, polyurethanes, polyvinylalcohols, polyvinylacetates, dextrins, modified starches, asphalt emulsions, corn starch, nylon, polypropylene, polyhydroxyalkanoates, as well as dispersions of ethylene containing homopolymers, copolymers stabilized in water including those mentioned in US 2007/0292705 and EP 1963573B1; aqueous dispersions of ethylene-acrylic acid (EAA) and ethylene-methacrylic acid copolymers, such as those available under the trademarks PRIMACOR™ (trademark of SK Global Chemical), NUCREL™ (trademark of E. L DuPont de Nemours), and ESCOR™ (trademark of ExxonMobil) and described in U.S. Pat. Nos. 4,599,392, 4,988,781, and 5,938,437 as well as in CN105102508A: aqueous dispersion of polymers including ethylene ethyl acrylate (EEA) copolymers, ethylene methyl methacrylate (EMMA), and ethylene butyl acrylate (EBA); other aqueous dispersion of ethylene-carboxylic acid copolymers may also be used, including ethylene/methacrylic acid copolymers, ethylene/itaconic acid copolymers, ethylene/methyl hydrogen maleate copolymers, ethylene/maleic acid copolymers, ethylene/acrylic acid/methyl methacrylate terpolymers, ethylene/acrylic acid/ethyl acrylate terpolymers, ethylene/methacrylic acid/ethyl acrylate terpolymers, ethylene/itaconic acid/methyl methacrylate terpolymers, ethylene/methyl hydrogen, maleate/ethyl acrylate terpolymers, ethylene/acrylic acid/vinyl acetate terpolymers, ethylene/methacrylic acid/vinyl acetate terpolymers, ethylene/acrylic acid/vinyl alcohol terpolymers, ethylene/propylene/acrylic acid terpolymers, ethylene/acrylamide/acrylic acid terpolymers, ethylene/styrene/acrylic acid terpolymers, ethylene/methacrylic acid/acrylonitrile terpolymers, ethylene/fumaric acid/vinyl methyl ether terpolymers, ethylene/vinyl chloride/acrylic acid terpolymers, ethylene/vinylidene chloride/acrylic acid terpolymers, polyethylene/acrylic acid graft copolymers, polyethylene/methacrylic acid graft copolymers, polymerized ethylene/propylene/acrylic acid graft terpolymers; fatty acid modified polyester terephthalate (PET), and tall oil modified soft polyester terephthalate (PET) as described in CA 2818315A1, and combinations thereof, and the like.

Suitable regular fillers from composition B of the aqueous sealing primer include, but are not limited to, coating grade clays, calcium carbonate, talc, barium sulfate, zinc sulfate, aluminum sulfate, calcium oxide reaction products, titanium dioxide, lithopone, zinc sulfide, alumina, silica, sodium hexametaphosphate, and mineral particles pretreated with polymer binder as disclosed in U.S. Pat. No. 9,803,088B2, US 2011/0046284A1, EP2470718A2, EP2470718B1 and US2013/0225744A1, and mixtures thereof.

Suitable dried coating weight for the aqueous barrier coating is in the range of 3 $g/m^2$ to 30 $g/m^2$, preferably in the range of 5 $g/m^2$ to 25 $g/m^2$, and most preferably in the range of 8 $g/m^2$ to 20 $g/m^2$. If an optional aqueous sealing primer is used underneath the aqueous barrier, the dried coating weight of the aqueous barrier coating can be expected to be lower and in the range of 3 $g/m^2$ to 25 $g/m^2$, preferably in the range of 4 $g/m^2$ to 20 $g/m^2$, and most preferably in the range of 5 $g/m^2$ to 15 $g/m^2$ to achieve acceptable barrier performance toward water (hot or cold), oil and grease. Typical properties of the aqueous barrier coatings are: viscosity in the range of 100 centipoise (cps) to 500 cps, preferably in the range of 150 cps to 500 cps, and most preferably in the range of 190 cps to 350 cps; % solid in the range of 25% to 50%, preferably in the range of 30% to 45%, and most preferably in the range of 35% to 40%, and pH value in the range of 7 to 11, more preferably in the range of 8 to 10, and most preferably in the range of 8.5 to 9.5.

A suitable dried coating weight for the aqueous sealing primer is in the range of 3 $g/m^2$ to 20 $g/m^2$, preferably in the range of 5 $g/m^2$ to 15 $g/m^2$, and most preferably in the range of 7 $g/m^2$ to 12 $g/m^2$. Typical properties of the aqueous barrier coatings are: viscosity in the range of 150 centipoise (cps) to 5000 cps, preferably in the range of 200 cps to 3000 cps, and most preferably in the range of 300 cps to 1000 cps; % solid in the range of 30% to 60%, preferably in the range of 40% to 55%, and most preferably in the range of 45% to 50%; pH value in the range of 7 to 11, more preferably in the range of 8 to 10, and most preferably in the range of 8.5 to 9.5.

The cellulosic substrate is substantially flat and the aqueous barrier coating and optional aqueous optional sealing primer may be applied using a rod coater, a blade coater, an air knife coater, a curtain coater, a slot die coater, an iso-bar rod coater, a gravure coater, a reverse gravure coater or by flexography. In another optional aspect, the aqueous barrier coating and optional aqueous sealing primer are applied using a rod coater where the rod is provided with a resilient tip metering element. In another optional aspect, the rod provided with a resilient tip metering element is an INVOR Tip. In another optional aspect, a curtain coater is used to apply the one or more of aqueous barrier coating, optional aqueous sealing primer and top coat in multiple layers.

In another optional aspect, the aqueous barrier coating and optional aqueous sealing primer is dried at a temperature from about 50° C. to about 125° C., or preferably from 60° C. to about 125° C., or most preferably from 70° C. to about 120° C.

EXAMPLES

The following parameters are applicable to the examples presented herein:

Viscosity—Viscosity was measured with a Brookfield Viscometer model LV with an appropriate spindle and rpm at 25° C. or a specified temperature per manufacturer instructions.

Percentage solid: EPA method 24 and theoretical calculations based on the solid of each raw material is used to determine the solid percentage of the water based coating composition.

Heat Sealing: A Lab heat sealing unit from Packaging Industries, Inc., Model 12A9 was used to perform sealing test. Two coated sheets were stacked together with the first major side of both sheets facing down in the same direction. The stacked sheets are placed into the heat seal zone of the heat sealer with heating only from the top heated bar with the heat seal conditions set at 24 psi for 1 sec at 375° F. setting (190-195° C. interface temperature). Percentage of fiber tear along the heat seal strip is recorded as measure of quality of the seal, with 100% fiber tear as the perfect seal, above 80% is preferable and above 90% is most preferable.

Lab Drying Conditions: Lab prepared aqueous barrier coating and optional aqueous sealing primer coated sheets are dried at 90-100° C. for 30 seconds before handing.

Block Resistance: The blocking behavior of the samples was tested by evaluating the adhesion between the barrier coated side and the other uncoated side. The coated paperboard was cut into 2"×2" (5.1 cm×5.1 cm) square samples. Several duplicates were tested for each condition, with each duplicate evaluating the blocking between a pair of samples (For example, if four duplicates were test, four pairs—eight pieces—would be used). Each pair was positioned with the barrier-coated side of one piece contacting the uncoated side of the other piece. The pairs were placed into a stack with a spacer (foil, release paper, or even copy paper) between adjacent pairs. The entire sample stack was put under 100 psi load, 50° C. for 24 hours. The test stack was then removed from the test environment and cooled to room temperature. The pressure was then released, and the samples removed from the stack. The samples were evaluated for tackiness and blocking by separating each pair of paperboard sheets. Blocking damage is visible as fiber tear, which if present usually occurs with fibers pulling up from the non-barrier surface of samples. The results were reported as 5: Excellent: Falls apart easily, no tendency to blocking
4: Good: Slight cling but separate without picking or fiber tearing
3: OK: Slight cling or tack while separating but no fiber picking.
2: Poor: Medium to strong cling or tack while separating and up to 25% fiber picking or coating damage
1: Bad: Over 25% fiber tearing Cobb Test for water resistance: One indicator of the effectiveness of the liquid barrier properties of a coating composition is how much liquid a coated substrate will absorb in a specified amount of time. The TAPPI T 441 test method was employed to measure the water absorptiveness of the coated substrate by a Cobb Sizing Tester (Testing Machines, Inc., Model 61-04). The water absorptiveness (Cobb value) is defined as the mass of water absorbed in a specific time by 1 m$^2$ of paper, board, or corrugated fiberboard under 1 cm of water. The standard test time is a period of 30 min. A Cobb value less than 10 g/m$^2$, and preferably; less than 5 g/m$^2$ is generally required for liquid packaging.

3M Kit Test for oil and grease resistance: The oil and grease resistance (OGR) of the samples was measured on the 'barrier side' by the 3M kit test (TAPPI Standard T559 cm-02). With this test, ratings are from 1 (the least resistance to oil and grease) to 12 (excellent resistance to oil and grease penetration). A rating of 10 and higher is preferable requirement for liquid packaging.

Stain resistance test (oil and grease resistance): Besides the 3M test kit, an oil absorptiveness test was run to compare the oil and grease resistance on various coated paper substrates. The coated sheet was cut to 4-inch×4-inch squares (10 mm×10 mm) and then scored along one diagonal line corner to corner on the coated side (first major side), then scored along another diagonal line on opposite corners on the second major side. Using a mixture of corn oil tinted with an oil soluble dye (1.0%), a 1.0 ml of this solution was applied on a 3 inch×3 inches (76 mm×76 mm) blotter sheet, saturating the sheet. The blotter was then applied onto the surface of the coated first major side of the coated paper. On the other side of the coated barrier paper, a stain absorber sheet 4-inch×4-inch (10 mm×10 mm) was placed to absorb any migration of oil that may come through. The three sheets were then sandwiched in between two sheets of aluminum foil cut to 4-inch×4-inch. This 5 layer sample sandwich set is repeated 5 times and stacked on top of each other in a pile and then placed under a 4-inch sq. block weighing of 408 grams (0.9 lbs.) and placed in an oven at 60 degree C. for 4 hours. After oven exposure, each construction was removed from oven and cooled to room temperature. Each set of sample sandwich was removed separately, the aluminum foil and blotter paper then removed so the stain absorber sheet and back side of barrier paper were able to be evaluated for any oil migration that may have come through the sheet. The number of spots and % area were then recorded.

Hot Coffee Cup Test: Hot coffee with creamer brewed and/or heated to 95° C. was poured into a formed paper cup for 30 minutes. The cup was then inspected for any leakage after the 30 minutes test period. No leakage is considered a passed.

Shear storage modulus curve determination: TA instrument RDA model ARES G2 was used in generating the shear storage modulus of the dried film. 8 mm or 25 mm parallel plate geometry was used to conduct the temperature sweep run on RDA instrument from 0° C. to 150° C. at 5° C./minutes ramp rate, at angular frequency of 10 rads/sec., and under auto-tension and auto-strain mode. A sample film was prepared by casting about 4 to 5 grams of a wet sample on a releasable silicone rubber cup with diameter of 5 cm.

The filled cup was then put in 50° C. oven for 24 hours followed by applying vacuum at 50° C. for another 24 hours to remove residual water in the film. The achieved dried film is about 0.8 to 1.5 mm thick. Once the shear modulus curve is generated, the modulus in the following three temperature ranges were recorded for comparison: 50° C. to 60° C., 80° C. to 90° C. and 100° C. to 110° C.

Ink overprintability: ACTEGA North America Performa aqueous flexo ink system was used to perform overprintability of the dried aqueous barrier coatings from this invention. Free of de-wet surface defects and good tape adhesion was performed with 3M #810 tape per ASTM F2252-03.

The compositions of aqueous barrier coating Example 1 to Example 5 and Comparative Example 1 to Comparative Example 3 are listed in Table 1. Comparative Example 4 is the extrusion LDPE which is on Clearwater 18 point polyboard with about 7.2 lbs/MSF (35.2 gsm) of LDPE. The components of the example compositions in accordance with the present invention were prepared by adding the binder dispersion(s) and defoamer in a high density polyethylene plastic container of proper size and adding the remaining ingredients one at a time while mixing with a saw-tooth mixing blade at a medium speed 700 rpm. The whole composition was then mixed for 30-60 minutes to reach a stable viscosity. % solid, viscosity, and pH were measured in the according to the methods describe above.

For one coat system (aqueous barrier coatings), each composition was applied with #18 wire wound rod on 18 point Westrock SBS stock and dried at 90-100° C. for 30 seconds before handing and allowed to cool and dwell overnight before performing any physical testing was performed. The applied dried coating weight range is between 15 to 22 gsm.

TABLE 1

Compositions for Example 1 to 5 and Comparative Examples 1 to 3

| Ingredient | Chemical type & melting point or Tg | Example 1 | Example 2 | Example 3 | Example 4 | Comparative Example 1 | Comparative Example 2 | Comparative Example 3 | Example 5 |
|---|---|---|---|---|---|---|---|---|---|
| 33% solid of Amine Neutralized Primacor Copolymer* dispersion | Crystalline EAA polymer m.p. 75 C. | 92.00 | 92.00 | 84.00 | 80.00 | | | | 89.50 |
| Mallard Tykote 6160 | Acrylic coplolymer Tg +7 C. | | | | | 45.00 | | | |
| Royal Adhesives Paracryl 8936 | Modified stryrenated acrylic copolymer, Tg +18 C. | | | | | 27.25 | | | |
| Mallard Creek Tykote 1019 | SBR, Tg +14 C. | | | | | | | 85.00 | |
| BASF HSL 9010 | Modified acrylic copolymer, Tg −10 C. | | | | | | 92.85 | | |
| BYK Aqucer 8335 (Paraffine) | Paraffine, m.p. 58 C. | | | | | | 17.00 | | |
| BYK Aqucer 561 Wax Emulsion | Bee Wax, m.p. 65 C. | 8.00 | 4.00 | | | | 5.00 | | |
| Micro Powder Microklear 418 | Carnauba, m.p. 84 C. | | 1.00 | | | | 1.45 | | |
| SASOL C80-G Wax | Fischer-Tropsch wax, m.p. 85 C. | | 0.25 | | | | 0.30 | | |
| Micropower Microspersion230-50 | polyethylene wax, m.p. 114 C. | | | | 3.00 | | | | |
| Micro Powder Aqua Polysilk 19 | polyethylene, PTFE and amide m.p. 102-118 C. | | | | | | 2.00 | | |
| Aquacer 1547 | Oxidized PE, m.p. 125 C. | | | | | | | 5.00 | 3.00 |
| Micropowder Microspersion 6550 | PE/Amide, m.p. 124-135 C. | | | | 15.00 | | | | |
| Micro Powder Superslide 904 | Polyefin/amide, m.p. 138-145 C. | | | | 12.00 | | | 10.00 | |
| BYK Aquamat 8731 | EBS wax, m.p. 142 C. | | | | | | | | 4.50 |
| Imerys Mistron Monomix | Talc | | | | | | 7.00 | | |
| BYK ZAC | 15% Zinc Oxide solution | | | 0.5 | | | | | |
| Emerald FoamBlast 327 | Defoamer | | | | | | 1.00 | | |
| Evonik Surfonyl 440 | Wetting additive | | | 1.00 | | | 0.25 | | |
| Nouryon Alcogum L-29 | Thickener | | | | | | 0.50 | | |

TABLE 1-continued

Compositions for Example 1 to 5 and Comparative Examples 1 to 3

| Ingredient | Chemical type & melting point or Tg | Example 1 | Example 2 | Example 3 | Example 4 | Comparative Example 1 | Comparative Example 2 | Comparative Example 3 | Example 5 |
|---|---|---|---|---|---|---|---|---|---|
| Ashland Benecel ™ A4C | Methyl Cellulose Thickener | | | | | | 0.40 | | |
| Water | Diluent | | 2.25 | | 5.00 | | | | 3.00 |
| | Total | 100.00 | 100.00 | 100.00 | 100.00 | 100.00 | 100.00 | 100.00 | 100.00 |
| | pH | 8.1 | | 8.5 | 8.2 | 9.6 | 7.41 | 8.4 | 8.3 |
| | % Solid | 36.52 | | 36.30 | 41.39 | 52.00 | 45.80 | 39.42 | 34.37 |
| | Viscosity, cps | 1030 | | 194 | 440 | 950 | 250 | 3700 | 855 |
| | Total crystalline wt % | 100.00 | 97.25 | 99.00 | 95.00 | 19.00 | 6.75 | 15.00 | 97.00 |

*Primacor copolymer from SKGlobal Chemical having 18-22 wt % acrylic acid and Melt index (M.I.) of 1250-1350 g/10 min. at 190 c. per ASTM D1238

For two coat systems (sealing primer and aqueous barrier coating), the aqueous sealing primer was coated with #10 wire wound rod on 18 point Westrock SBS stock and dried at 90-100° C. for 30 seconds followed by aqueous barrier coatings using #8 wire wound rod and dried at 90-100° C. for 30 seconds. Cooled and dwell overnight before any physical testing was performed. Aqueous sealing primer used for this invention was prepared by mixing 40% wt of Royal Adhesives Hydra Fast 20915-DC20915 (acrylic emulsion), 20 w5% of water, 0.6 wt % of Ashland A4C Methyl Cellulose (thickener), 8.5 wt % of KaMin LLC, Polyplate HMT, 8.5 wt % of Imerys Mistron Monomix, and 22.4 wt % of Hydra Fast 20915-DC20915 resulting in 48.75% solid, pH value of 9.34, and viscosity of 360 cps on the average.

Figure 7:
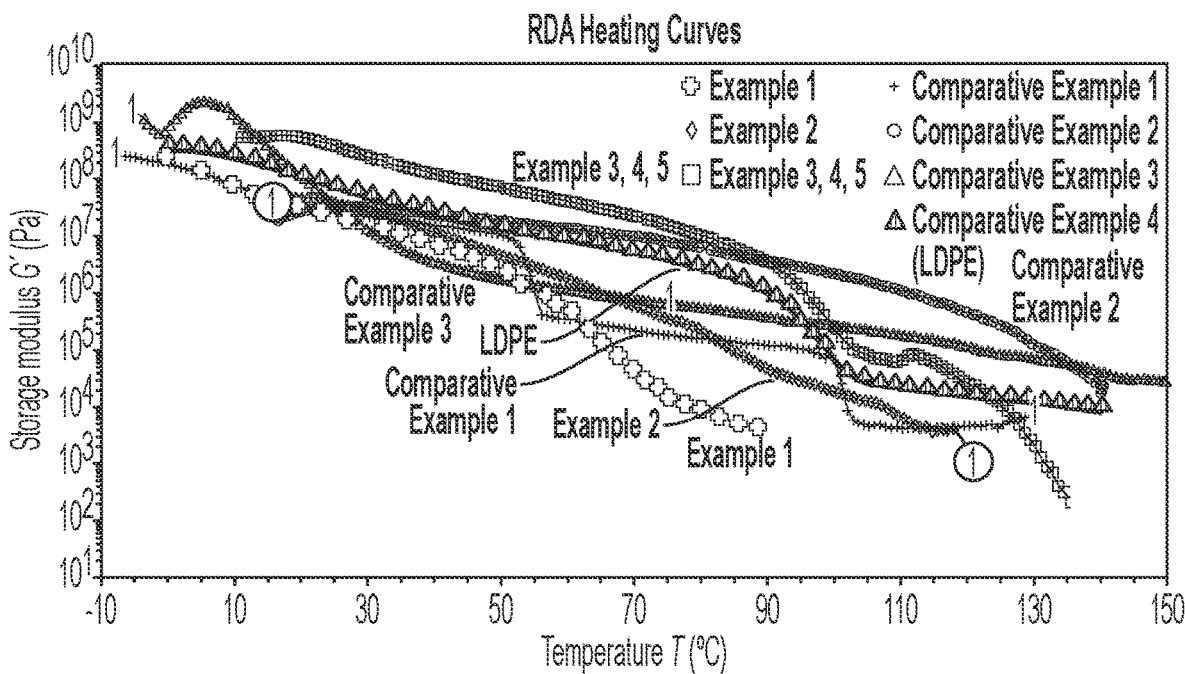
FIG. 7 illustrates the various heating shear elastic modulus curves for examples of the present invention and comparative examples of other coatings.

Performance properties of the innovative examples and comparative examples for one coat are listed in Table 2.

overprintability, they exhibited different performance over heat sealability, blocking resistance, cup making capability and hot coffee leak resistance. Note that comparative example 4 is commercially available Clearwater 18 point polyboard with about 7.2 lbs/MSF (35.2 gsm) of LDPE which is deemed non-recyclable and is what the current innovative composition trying to replace. Example 1 has 100 wt % total crystalline but utilize a crystalline active filler with melting point (m.p.) of 58° C. (below 70° C.) which resulted in it being to slightly worse in block resistance (rating of 3-4) as well as very lower shear storage modulus in the range of 50° C. to 80° C. (FIG. 7) and could not provide adequate cup making ability and perform the hot coffee test. While Example 2 attempted to use additional two waxes with m.p. above 70° C. (84 & 85C) and the zinc oxide crosslinker to increase the overall shear storage modulus

TABLE 2

Performance properties of the compositions for One coat system.

| | Example 1 | Example 2 | Example 3 | Example 4 | Comparative Example 1 | Comparative Example 2 | Comparative Example 3 | Example 5 | Comparative Example 4 (LDPE) |
|---|---|---|---|---|---|---|---|---|---|
| Cobb Test 30 min. grams/m² | 2.15 | 1.72 | 1.96 | 1.05 | 4.89 | 10.2 | 13.0 | 1.6 | 1.56 |
| 3M Kit Test Kit Test #12 | Passed | Passed | Passed | Passed | Passed | Passed | Passed | Passed | passed |
| Oil Stain Test | Passed | Passed | Passed | Passed | Passed | Passed | Passed | Passed | passed |
| Heat Seal of Face to Back | 100% fiber tear | 100% fiber tear | 100% fiber tear | 100% fiber tear | No Seal* | No Seal* | 100% fiber tear | 100% fiber tear | Excellent |
| Block Resistance Rating | 3-4 | 3-4 | 4-5 | 4-5 | 2 | 4-5 | 2-3, tacky surface | 4-5 | 5 |
| Cup Making | Failed | Failed | Good | Good | Failed | Failed | Failed | Good | Good |
| Hot Coffee Test | Can not be tested | Failed | Passed | Passed | Can not be tested | Can not be tested | Can not be tested | Passed | Passed |
| Overprintability | Good | Good | Good | Good | Good | Good | Good | Good | Good |
| Heat Seal of Face to Face | 100% fiber tear | 100% fiber tear | 100% fiber tear | 100% fiber tear | Not Tested | Not Tested | Not Tested | 100% fiber tear | Not Available |

*100% Fiber tear seal was only possible at 200-215° C. interface seal temperature.

In general, 30-minute Cobb test values of 10 grams per square meter (gsm) or less is considered good and 5 gsm or less is considered as excellent, any values above 12 gsm is considered to compromise the water resistance from end use prospective. Based on the results listed in Table 2, even though all innovative examples and comparative examples showed good 30-minute Cobb values (water resistance) except for Comparative Example 3, highest 3M kit value of 12 (grease resistance), passing oil stain test, and good curve compared to Example 1 (FIG. 7), its shear storage modulus in the range of 80° C. to 110° C. is still lower than those of the LDPE. This resulted in the re-crystallization speed or strength is not high enough to allow for consistent cups forming. Hot coffee test was conducted on some of the good cups and the seal lines showed obvious leaking stain. Higher m.p. waxes, higher wax wt %, and with various wax combination were used in Example 3 to Example 5. The higher wax wt % and higher melting point rendered the overall shear storage modulus curves to move upwards to be slightly above that of the LDPE curve. These three different combinations of waxes from Example 3 to Example 5 yielded almost overlapping shear storage modulus cure in the range from 30° C. to 110° C. The overall shear modulus curves for Example 3 to Example 5 exhibited good block resistance (rating of 4 to 5), 100% fiber tearing seal, good cup forming performance, and good hot coffee resistance comparable to those from commercial LDPE extruded poly boards.

Figure 3:
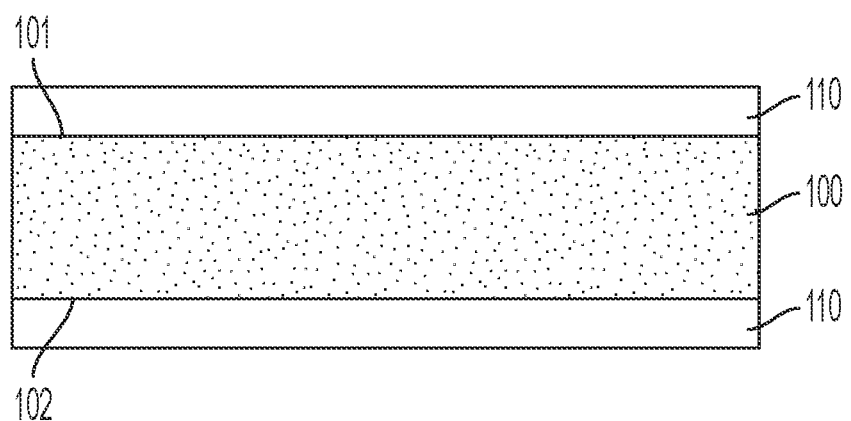
FIG. 3 illustrates a cellulosic substrate coated on both its first and second major sides with the aqueous barrier coating.
Figure 4:
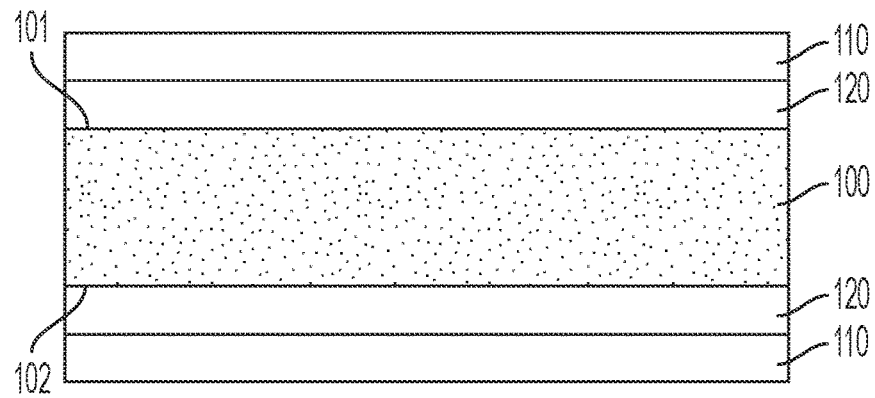
FIG. 4 illustrates a cellulosic substrate with both major sides coated with an aqueous sealing primer, followed with the aqueous barrier coating.

To demonstrate that when both the major sides of the substrate is coated with the innovative aqueous barrier coating composition as shown in FIG. 3. Face to face seals were also performed for Example 1 to Example 5 with 100% fiber tearing seals last row in Table 2.

Comparative Example 1 and Comparative Example 2 utilized acrylics binder dispersions with no crystallinity and Tg from −10° C. to 18° C. which are typical used in heat sealable applications. Waxes were used to balance the sealability as well as the block resistance. Comparative Example 1 showed no heat sealability under standard heat seal interface temperature of 190-195° C. which affected the cup making success and 100% fiber tearing is only possible at polymer binder, the composition did not have fast enough melt flow for promoting bond formation nor fast enough bond developing during cooling step in the cup making process.

Comparative Example 3 utilized softer non-crystalline SBR binder dispersion so that the composition can allow for the use of higher melting point waxes to balance the sealability and block resistance. Due to SBR polymer, the surface remains tacky depside higher m.p. waxes and higher loading were used. Its shear storage curve also showed flat in the heat seal temperature range for good melt flow developing. Similarly, without the crystallinity in the polymer binder, the composition did not have fast enough melt flow for promoting bond formation nor fast enough bond developing during cooling step in the cup making process.

Results from the 2 coat system (aqueous sealing primer followed by aqueous barrier coatings) are listed in Table 3. The aqueous sealing primer used is described earlier. Except for the 30-minute Cobb values, all the rest of the property test results echo exactly the same trends as the one coat system. Here Comparative Example 2 is the only one that exceeds 10 gsm. The shear storage modulus curve is only applicable to the aqueous barrier coating itself.

TABLE 3

Performance properties of the compositions for Two coat system.

| | Example 1 | Example 2 | Example 3 | Example 4 | Comparative Example 1 | Comparative Example 2 | Comparative Example 3 | Example 5 |
|---|---|---|---|---|---|---|---|---|
| Cobb Test 30 min. grams/m² | 6.84 | 9.28 | 4.43 | 3.66 | 6.92 | 17.8 | 2.54 | 3.32 |
| 3M Kit Test Kit Test #12 | Passed | Passed | Passed | Passed | Passed | Passed | Passed | Passed |
| Oil Stain Test | Passed | Passed | Passed | Passed | Passed | Passed | Passed | Passed |
| Heat Seal of Face to Back | 100% fiber tear | 100% fiber tear | 100% fiber tear | 100% fiber tear | No Seal | No Seal | 100% fiber tear | 100% fiber tear |
| Block Resistance Rating | 3-4 | 3 | 4-5 | 4-5 | 2 | 5 | 2-3, tacky surface | 4-5 |
| Cup Making | Failed | Failed | Passed | Passed | Failed | Failed | Failed | Passed |
| Hot Coffee Test | Failed | Failed | Passed | Passed | Can not be tested | Can not be tested | Can not be tested | Passed |
| Overprintability | Good | Good | Good | Good | Good | Good | Good | Good |
| Heat Seal of Face to Face | 100% fiber tear | 100% fiber tear | 100% fiber tear | 100% fiber tear | Not Tested | Not Tested | Not Tested | 100% fiber tear |

*100% Fiber tear seal was only possible at 200-215° C. interface seal temperature.

seal interface temperature of 200-215° C. Shear storage modulus curve of Comparative Example 1 showed two sudden dips, one form lower m.p. wax and one from acrylic binder (possibly from lower molecular weight) and the curve also has lower shear storage modulus in all temperature range. Even though higher loading of high temperature waxes can move the curve upwards as previous example, but this will only make the heat seal worse than it is. Comparative Example 2 also showed no heat sealability under standard heat seal condition and high temperature is required to achieve 100% fiber tear and thus affected its cup making efficiency as well. However, its shear storage modulus curve showed only small reduction while temperature increase compared to that of LDPE and does not allow the polymer to readily flow out at heat seal temperature to have a good fiber tearing seal. In this case, polymer composition does not exhibit proper melt at seal temperature for fast bond forming and developing. Lowering wt % of wax will cause blocking problem even though it might help to promote melt flow of the polymer composition. Without the crystallinity in the A coated cellulosic substrate with above mentioned inventive aqueous barrier coating with or without the optional sealing primer provides easy repulpability and recyclability, good heat sealability, resistance to roll blocking, container forming feature, good barrier to water (including hot water and hot coffee), oil and grease liquids as well as exhibiting good over-printability.

Modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

We claim:
1. An aqueous barrier coating for shape-formable cellulosic substrates, wherein said coating is polyurethane free and comprises as components:
  A) at least one polymer binder dispersion at 40 wt. % to 95 wt. % of the coating:

B) at least one active filler at 3 wt. % to 30 wt. % of the coating; and

C) one or more optional additives, wherein crystallinity is present in at least one of component A) and component B), and wherein a resulting dried film of the coating has a shear storage modulus between 50° C. and 60° C. in the range of $1.5 \times 10^6$ to $1 \times 10^9$ Pascals, a shear storage modulus between 80° C. and 90° C. in the range of $2 \times 10^5$ to $5 \times 10^7$ Pascals, and a shear storage modulus between 100° C. and 110° C. in the range of $5 \times 10^3$ to $1 \times 10^6$ Pascals.

2. The aqueous barrier coating of claim 1, wherein the combined weight percentage of component A) and component B) is greater than 50 wt. % of the total coating weight.

3. The aqueous barrier coating of claim 2, wherein the combined weight percentage of component A) and component B) is greater than 60 wt. % of the total coating weight.

4. The aqueous barrier coating of claim 2, wherein the combined weight percentage of component A) and component B) is greater than 65 wt. % of the total coating weight.

5. The aqueous barrier coating of claim 1, wherein the melting point in crystalline phase of component A) is in the range of 50° C. to 140° C.

6. The aqueous barrier coating of claim 1, wherein component B) is a dry wax or a pre-dispersed wax with a melting point of its crystalline phase in the range of 70° C. to 145° C.

7. A cellulosic substrate coated with the aqueous barrier coating of claim 1, wherein said coating is applied to at least one of first and second major sides of the cellulosic substrate.

8. The cellulosic substrate of claim 7, wherein the total dried weight of said coating is in the range of 3 to 35 g/m³.

9. The cellulosic substrate of claim 8, wherein the total dried weight of said coating is in the range of 5 to 25 g/m³.

10. The cellulosic substrate of claim 8, wherein the total dried weight of said coating is in the range of 8 to 25 g/m³.

11. The cellulosic substrate of claim 7, wherein the dried weight of said coating is in the range of 12 to 35 g/m³.

12. The cellulosic substrate of claim 11, wherein the dried weight of said coating is in the range 13 to 28 g/m³.

13. The cellulosic substrate of claim 11, wherein the dried weight of said coating is in the range of 15 to 25 g/m³.

14. The cellulosic substrate of claim 7 further comprising an aqueous sealing primer applied and dried upon the at least one major side upon which the coating is to be subsequently applied.

15. The cellulosic substrate of claim 14, wherein the aqueous sealing primer comprises A) at least one aqueous polymer binder dispersion at 30-90 wt. % of the coating;

B) at least one particulate filler at 5-60 wt. %, selected from the group consisting of coating grade clays, calcium carbonate, talc, barium sulfate, zinc sulfate, aluminum sulfate, calcium oxide reaction products, titanium dioxide, lithopone, zinc sulfide, alumina, silica, sodium hexametaphosphate, and mineral particles pretreated with polymer binder; and C) at least one optional additive.

16. The cellulosic substrate of claim 14, wherein the dried weight of the aqueous barrier coating is in a range of 3 to 15 g/m³ and the dried weight of the aqueous sealing primer is in a range of 3 to 15 g/m³.

17. The cellulosic substrate of claim 7, wherein the substrate has an uncoated weight basis in a range of 40 to 300 pounds per 3000 lb/foot².

18. The cellulosic substrate of claim 7, wherein the substrate is a paperboard substrate with a caliper thickness in a range of 4 points to 30 points.

19. The aqueous barrier coating of claim 1, wherein crystallinity is present in component A).

20. The aqueous barrier coating of claim 19, wherein component A) is selected from the group consisting of ethylene containing homopolymer and copolymers stabilized in water, ethylene-acrylic acid (EAA) copolymers, ethylene-methacrylic acid copolymers, ethylene/itaconic acid copolymers, ethylene/methyl hydrogen maleate copolymers, ethylene/maleic acid copolymers, ethylene/acrylic acid/methyl methacrylate terpolymers, ethylene/acrylic acid/ethyl acrylate terpolymers, ethylene/methacrylic acid/ethyl acrylate terpolymers, ethylene/itaconic acid/methyl methacrylate terpolymers, ethylene/methyl hydrogen, maleate/ethyl acrylate terpolymers, ethylene/acrylic acid/vinyl acetate terpolymers, ethylene/methacrylic acid/vinyl acetate terpolymers, ethylene/acrylic acid/vinyl alcohol terpolymers, ethylene/propylene/acrylic acid terpolymers, ethylene/acrylamide/acrylic acid terpolymers, ethylene/styrene/acrylic acid terpolymers, ethylene/methacrylic acid/acrylonitrile terpolymers, ethylene/fumaric acid/vinyl methyl ether terpolymers, ethylene/vinyl chloride/acrylic acid terpolymers, ethylene/vinylidene chloride/acrylic acid terpolymers, polyethylene/acrylic acid graft copolymers, polyethylene/methacrylic acid graft copolymers, polymerized ethylene/propylene/acrylic acid graft terpolymers; fatty acid modified polyester terephthalate (PET), and tall oil modified soft polyester terephthalate (PET).

* * * * *